July 12, 1966 T. W. CUNNINGHAM 3,260,225
WAFERING MACHINE
Filed Sept. 5, 1961 4 Sheets-Sheet 1
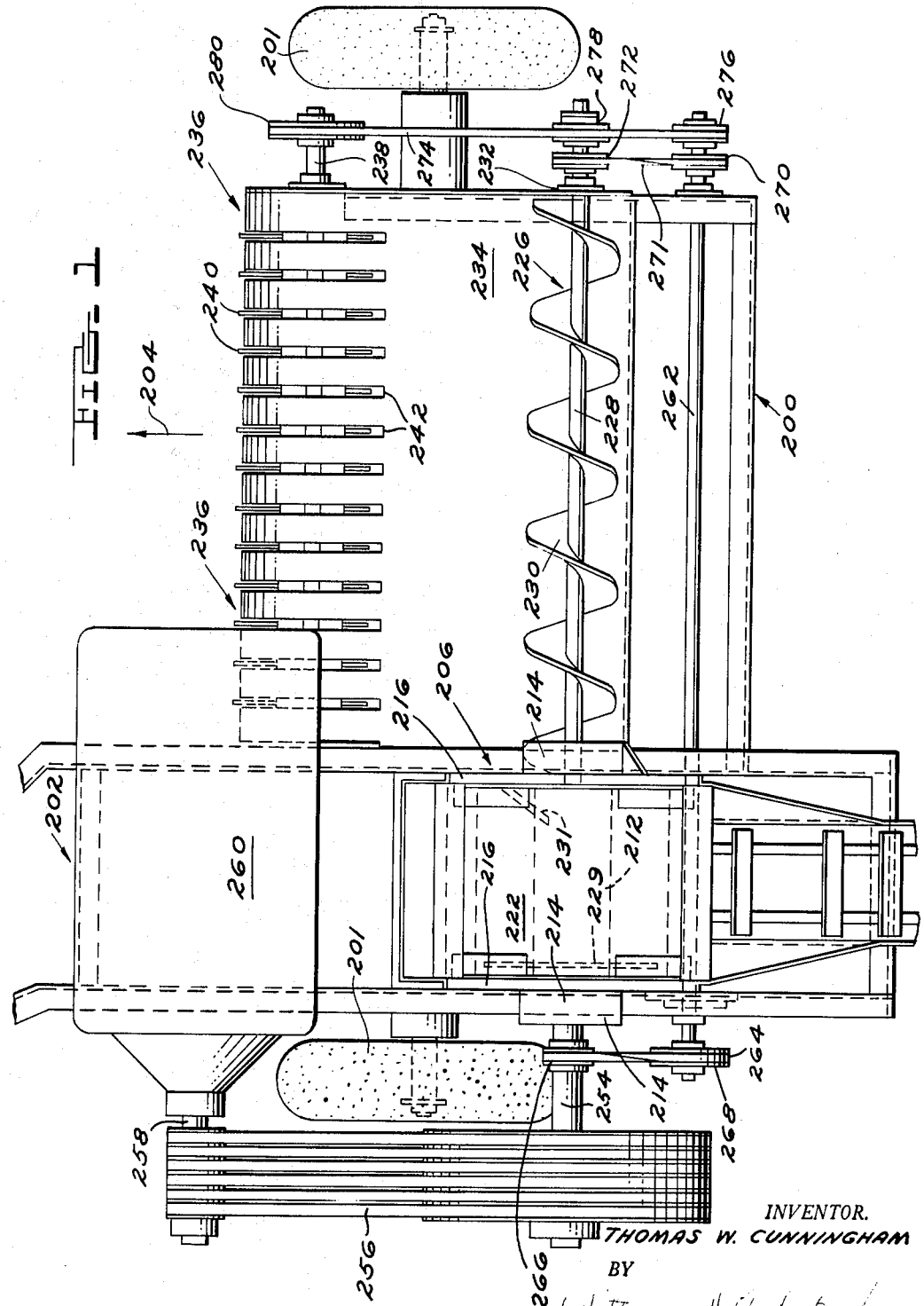
INVENTOR.
THOMAS W. CUNNINGHAM
BY
ATTORNEYS

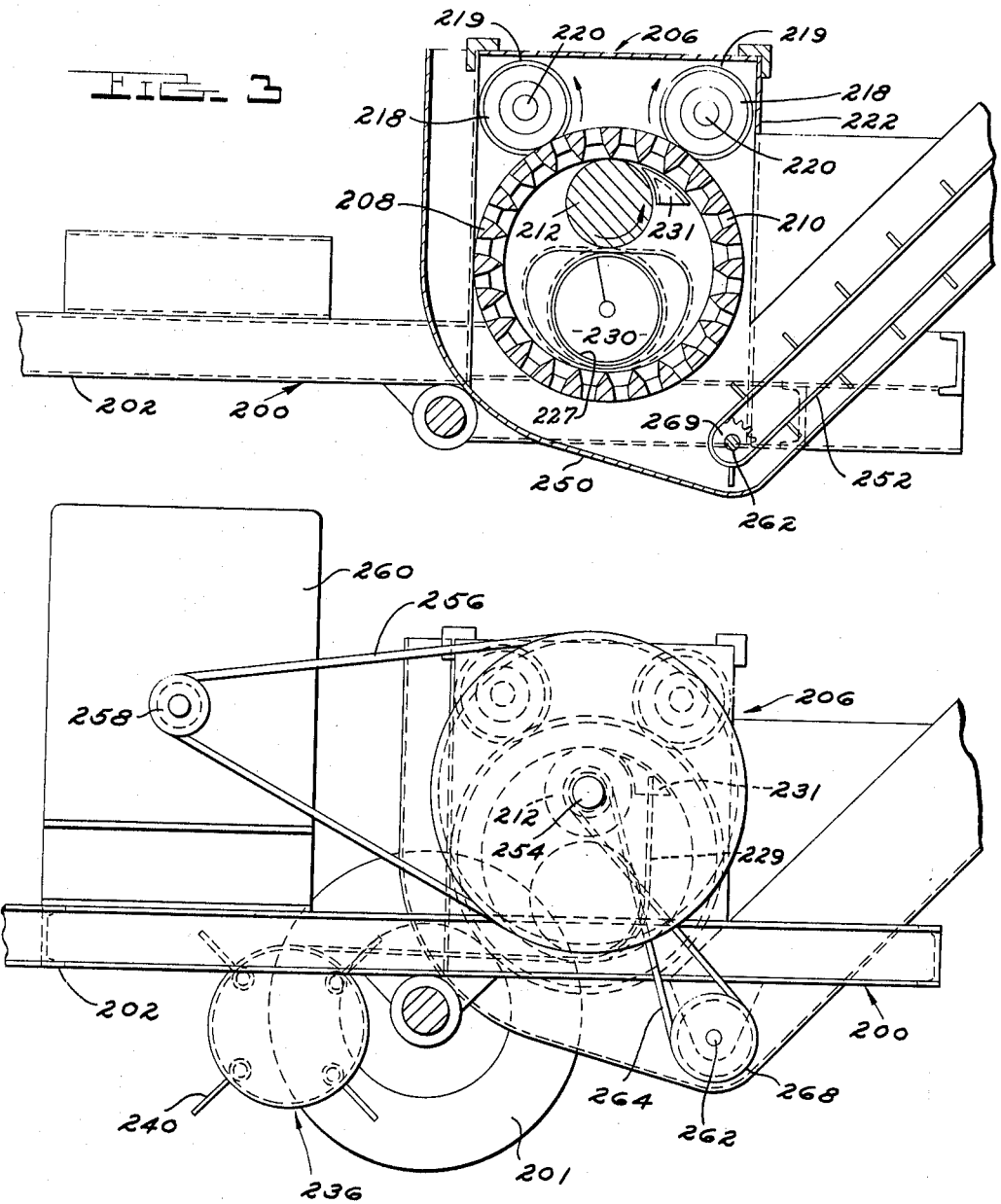

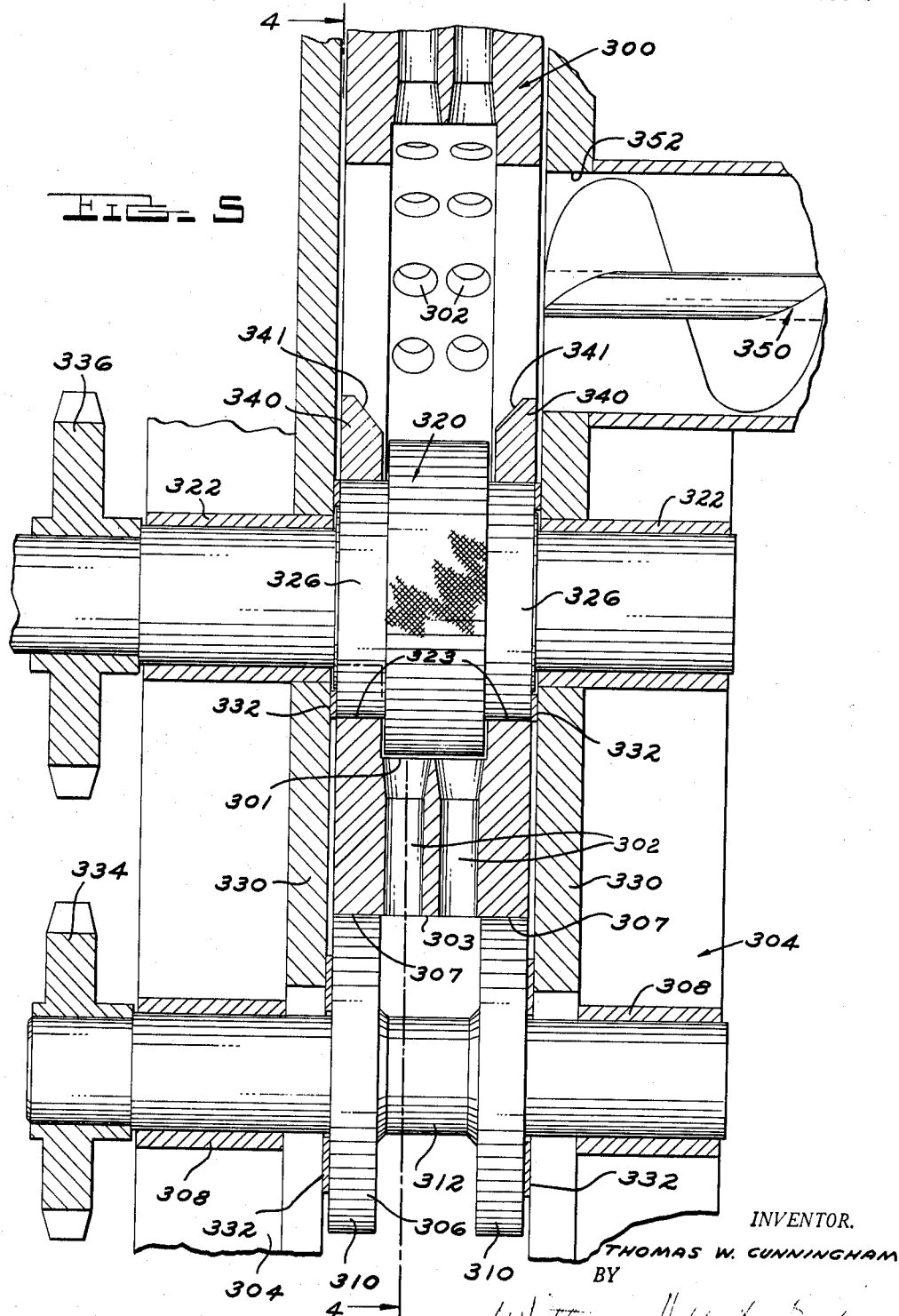

July 12, 1966 T. W. CUNNINGHAM 3,260,225
WAFERING MACHINE
Filed Sept. 5, 1961 4 Sheets-Sheet 4
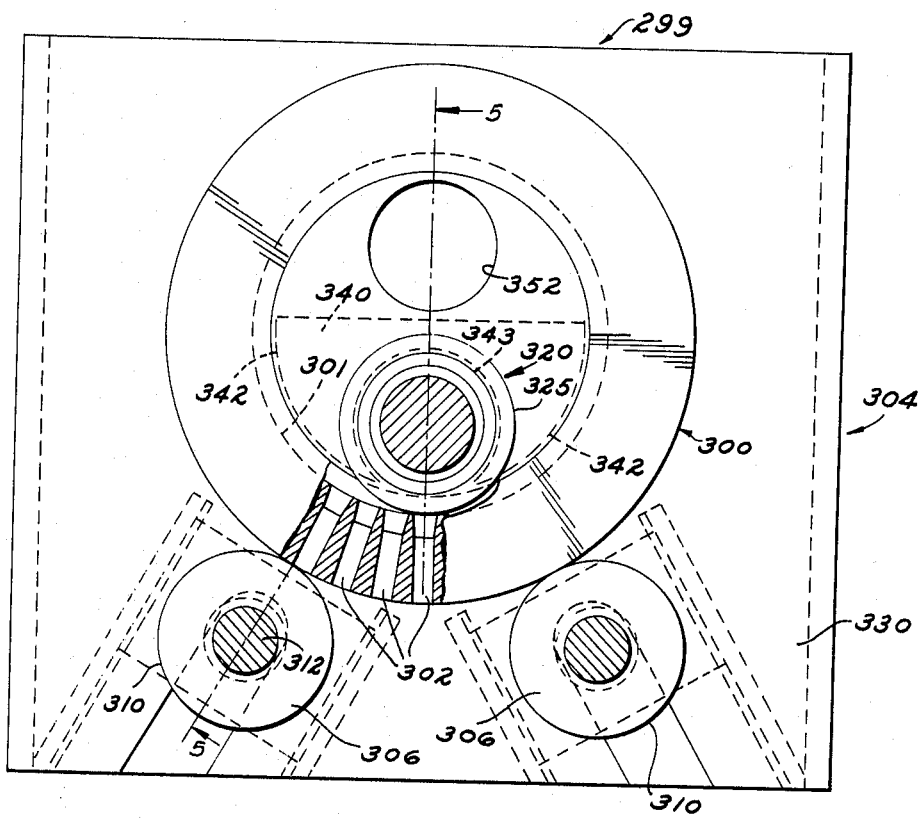
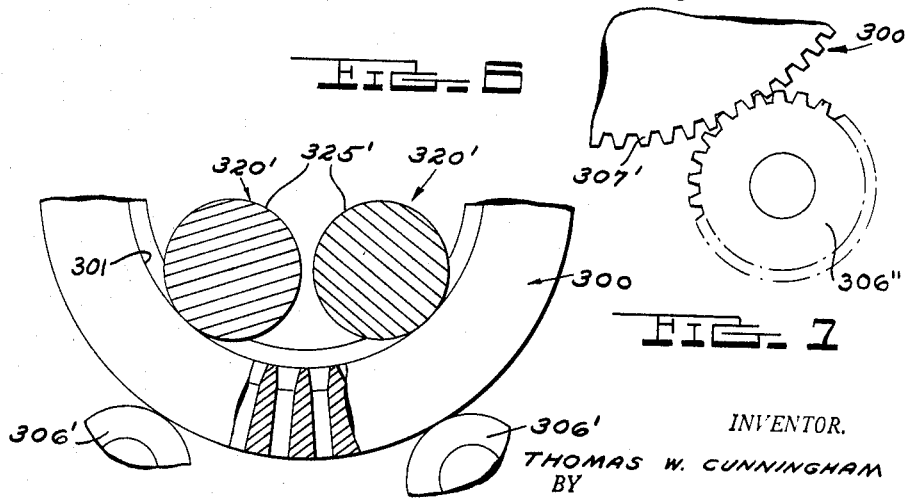
INVENTOR.
THOMAS W. CUNNINGHAM
BY
ATTORNEYS 3,260,225
WAFERING MACHINE
Thomas W. Cunningham, Chicago, Ill., assignor, by direct and mesne assignments, to Cunningham & Sons, Chicago, Ill., a partnership
Filed Sept. 5, 1961, Ser. No. 136,071
9 Claims. (Cl. 107—8)

This invention relates generally to a wafering machine and refers more particularly to a machine for compressing a cut crop and forming the same into dense wafers or pellets.

A cut crop, such as hay for example, is much more conveniently handled in a compressed dense form. Not only is handling easier but less storage space is required. Accordingly, an essential object of the invention is to provide a machine of relatively simple construction and high efficiency which is adapted to receive a cut crop and compress the same into a dense pellet or wafer form of a size which is easily handled and readily stored.

Another object is to provide a machine for compressing and wafering a cut crop comprising a movable member preferably in the form of a rotatable ring having circumferentially spaced openings extending generally radially therethrough, and means for pressing the crop through the openings during rotation of the ring.

Another object is to provide a machine wherein the means for pressing the crop through the openings in the ring includes a cylindrical presser mounted adjacent to the ring for rotation about an axis parallel to the axis of rotation of the ring and in a position such that the periphery of the cylindrical presser closely approaches the periphery of the ring.

Another object is to provide a machine having a device for cutting off the compressed wafers extruded from the holes in the ring, the cut-off device being located in predetermined adjusted position on the opposite side of the ring from the cylindrical presser.

Another object is to provide a machine wherein the cylindrical presser roll is power-driven and is in friction contact with the apertured ring to rotate the ring.

Another object is to provide a machine wherein the periphery of the presser is grooved to have a more effective cutting action on the crop.

Other objects and features of the invention will become apparent as the description proceeds, especially when taken in conjunction with the accompanying drawings, illustrating a preferred embodiment of the invention, wherein:

FIGURE 1 is a plan view of a machine embodying my invention.

FIGURE 2 is a side elevational view of the machine shown in FIGURE 1.

FIGURE 3 is similar to FIGURE 2 with parts in section and parts omitted for clarity.

FIGURE 4 is a fragmentary view taken on line 4—4 of FIGURE 5 showing a modification of the wafering apparatus for use in the machine of FIGURES 1–3.

FIGURE 5 is a sectional view on the line 5—5 of FIGURE 4.

FIGURE 6 is a diagrammatic fragmentary view illustrating a modification of the apparatus shown in FIGURES 4 and 5.

FIGURE 7 is a diagrammatic fragmentary view illustrating still another modification of the apparatus shown in FIGURES 4 and 5.

Referring now more particularly to the drawings and especially to FIGURES 1, 2, and 3, the wafering machine there illustrated has a frame generally indicated at 200 and wheels 201. The machine is attached to a towing vehicle such as a tractor by means of a frame extension 202 and is moved in the direction of the arrow 204 in FIGURE 1. The wafering apparatus is generally indicated at 206 and includes a wafering ring 208 having cylindrical radially inner and outer surfaces with a plurality of like radial holes 210 extending therethrough. The ring is disposed within housing 222 with its axis horizontal and at right angles to the longitudinal center line of the machine, and is supported on a cylindrical presser roll 212 in housnig 222 which has a cylindrical outer surface in friction bearing engagement with the inner surface of the ring and whose axis extends parallel to the axis of the ring. The roll 212 is supported for rotation in journals 214 carried by the side members 216 of the wafering apparatus.

Back-up rollers 218 are journaled for rotation on pins 220 carried by the housing 222 for the wafering apparatus. The back-up rollers engage the outer peripheral surface of the wafering ring 208 to hold it firmly against the roll 212 and to stabilize it during rotation. There are four rollers 218 in axially aligned pairs, and the rollers have flanges 219 engaging the ends of the ring to hold it against axial movement.

An auger 226 is provided having a shaft 228 and a helical blade 230 thereon, extending into housing 222 through opening 227. The auger terminates at the opening 227, and is on an axis parallel to roll 212. The auger 226 is journaled for rotation on the frame by journals 232, and in operation is rotated in a direction to feed crop material into the ring. The auger takes crop material from the receiver 234 delivered thereto by the pick-up device 236. Pick-up device 236 comprises a shaft 238 having a plurality of radially outwardly extending tines 240 which rotate and pick up the crop during movement of the machine over the field. The receiver 234 is slotted at 242 to clear the tines of the pick-up device.

The roll 212 is positively driven in the direction of the arrow to drive the ring 208 at the same peripheral speed by friction contact therewith. Crop material delivered into the ring by the auger 226 is lifted with the rotating ring and fed into the bight between the roll 212 and the ring, causing the material to be compressed or forced into the openings 210 in the ring and eventually to be extruded radially outwardly beyond the outer periphery of the ring. An adjustable wafer cut-off device may be provided radially outwardly beyond the ring 208 or, as an alternative, the shafts 220 of the back-up rolls 218 may be utilized to sever the pellets from the ring. The shafts 220 extend across the axial length of the apertured portion of the ring 208 and thereby can serve as cut-off devices.

A baffle plate 229 is fastened within the end of housing 222 opposite the auger opening 227 to keep the material delivered by the auger from going past the openings 210 in the ring. At the auger end of the housing, there is secured a baffle 231 which is located close to the driven roll 212 so that the material will be deflected inwardly toward the wafering holes.

The severed wafer material drops to the bottom of the housing 222 and accumulates on the bottom wall 250 thereof to be picked up by the conveyor 252 and lifted to a wagon trailing behind the machine.

The roll 212 has a shaft 254 which is driven by belts 256 from the output shaft 258 of the engine 260. The shaft 254 drives a second shaft 262 journaled on the frame of the machine, by means of a belt 264 extending over sheaves 266 and 268 on the respective shafts. The shaft 262 extends from the lower drum 269 of the conveyor 252 so that by this means the conveyor 252 is driven. The shaft 262 extends to the other side of the machine and has a sheave 270 thereon which, through a belt 271 and sheave 272, drives the auger 226. A belt 274 extends over sheaves 276, 278 and 280 on the shafts 262, auger shaft 228 and pick-up shaft 238 whereby the pick-up device is rotated.

Briefly, the pick-up device rotates in a clockwise direction as viewed in FIGURE 2 to pick up crop material from the ground and deliver it to the receiver 234 where it is taken by the auger 226 and delivered to the ring 208. The crop material delivered to the ring 208 is compressed between the ring and the drum 212 and extruded beyond the outer periphery of the ring where it is cut off by the shafts 220 of the back-up rollers and deposited on the bottom wall 250 of the housing to be picked up by the conveyor 252 and delivered to a wagon or other suitable collection device.

The ring 208 is driven by friction contact alone between its inner peripheral surface and the surface of the drum 212, backed up of course by the friction contact between the outer periphery of the ring and back-up rolls 218. There is little, if any, slip between the roll 212 and the ring 208 so that the speed of the periphery of the roll 212 is substantially the same as that of the inner periphery of the ring 208.

FIGURES 4 and 5 illustrate a modification of the wafering apparatus for use in the machine shown in FIGURES 1–3. The wafering apparatus is indicated generally at 299 and includes a wafering ring 300 formed with concentric cylindrical radially inner and outer surfaces 301 and 303. The ring has wafering holes 302 extending radially through the ring from one surface to the other. The holes are arranged in two axially spaced rows, with the holes in each row circumferentially spaced from each other. The ring 300 is supported for rotation within the housing 304, corresponding to the housing 222 in FIGURE 3, and for this purpose a pair of back-up rolls 306 are provided. The axes of the back-up rolls 306 are parallel to the axis of the ring 300, and the rolls 306 are supported in bearings 308 carried by the housing 304.

Each roll 306 is formed with a pair of laterally spaced circular rims 310 connected by a cylindrical portion 312 of reduced diameter. The rims 310 of the back-up rolls 306 are spaced apart a distance sufficient to span the apertured outer surface 303 of the ring, and as seen, the rims 310 are in peripheral surface engagement with the lateral surface extensions 307 of the ring.

Extending within the ring on an axis parallel thereto is a presser roll 320. The roll 320 has spindles journaled in bearings 322 in the housing 304. The presser roll has an enlarged central cylindrical portion 325 of a width corresponding to the apertured portion of the ring. It will be noted that the ring has inwardly projecting ribs 323 on opposite sides of the cylindrical inner surface 301. The enlarged central portion 325 of the roll fits between the ribs 323. It will be noted that there is a clearance between the cylindrical surface of the enlarged central portion 325 of the presser roll and the opposed apertured radially inner surface 301 of the ring. The cylindrical portions of the presser roll on opposite sides of the enlarged central portion are indicated at 326 and contact the ribs 323.

The presser roll 320, ring 300 and back-up rolls 306 are laterally confined between portions 330 of the housing 304. Spacers 332 are provided between these rolls and the housing portions 330.

Suitable means are provided to positively drive the back-up rolls 306 and the presser roll 320. Sprockets 334 (one of which is shown in FIGURE 5) are mounted on the shafts of rolls 306 and a suitable chain (not shown) extends around the sprockets to synchronize them. A sprocket 336 on the shaft of presser roll 320 meshes with the chain to drive the back-up rolls in synchronism with the presser roll. Suitable means, not shown, are provided to rotate the presser roll shaft. The wafering ring 300 is rotated by friction surface engagement with the rims 306 of the back-up rolls and also by the engagement of the portions 326 of the presser roll with the inner surface of the ring. The presser roll is driven at a speed such that the peripheral speed of the surface of the central portion 325 exceeds the peripheral speed of the radially inner apertured surface 301 of the ring. Hence, there is a rubbing or chafing action on the crop material between these surfaces as it is pressed radially outward through the apertures 302 by the presser roll. Preferably the surface of the cylindrical portion 325 of the presser roll is knurled as shown to increase the cutting and rubbing action on the crop to break it up into fine particles.

It will be noted that the crop material is introduced to the ring by an auger 350 which extends into an opening 352 in the housing 304. The crop material thus introduced to the housing drops onto the presser roll 320 and is fed into the bite between the presser roll and the ring 300 by the rotation of the presser roll, and is compressed into the openings 302 by the presser roll 320. Fillers 340 are mounted in fixed position within the ring 300. The straight top horizontal surfaces of the fillers are beveled as shown at 341 to guide the crop material toward the center of the ring. The fillers take up the space between the housing walls and the central portions 325 of the presser roll and 301 of the ring to keep material off the surfaces 326 and 323. The remainder of the periphery of the fillers from the opposite ends of the straight upper edge, is indicated at 342 and is curved to follow the contour of the surfaces 323 of the ring, being cut out at 343 to clear the surfaces 326 of the presser roll. As the crop material extrudes from the radially outer ends of the openings, it is cut off by a suitable cut-off device and drops to the bottom of the housing for removal by a suitable conveyor. In this connection, the wafering apparatus 299 may be considered as replacing the wafering apparatus 206 in FIGURE 3. Hence, extruded crop material will be removed by a conveyor similar to the conveyor indicated at 252 in FIGURE 3.

The reduced portions 312 of the back-up rollers 306 may be utilized as a cut-off device. Thus as the wafers extrude to a length sufficient to contact the reduced portions 312, they will break off and drop to the bottom of the housing.

FIGURE 6 illustrates a modification of the wafering apparatus shown in FIGURES 4 and 5. The apparatus in FIGURE 6 differs only in that two presser rolls 320′, exactly like the presser roll 320 in FIGURES 4 and 5, are employed instead of one. The back up rolls are designated 306′. The presser rolls rotate on axes parallel to the axis of the ring 300 and are positively driven at a speed such that the peripheral speed of the surfaces of the central portions 325′ thereof exceeds the peripheral speed of the radial inner apertured surface of the ring. There is a slight clearance between surfaces 325′ of the rolls and 301 of the ring. This is exactly as it was in FIGURES 4 and 5. Hence the only difference in FIGURE 6 is that two presser rolls, of the same construction as in FIGURES 4 and 5, and bearing the same relation to the other parts of the structure, are employed instead of one, and these rolls are angularly spaced from one another as shown.

It will be understood of course that the section in FIGURE 6 has been taken through the central portions 325′ of the rolls, which portions act to force and compress the material through the holes in ring 300.

FIGURE 7 illustrates another modification in which the rims 310′ of the back-up rolls 306′ have toothed peripheries which mesh respectively with the teeth 307′ on the lateral extensions of the wafering ring. According to this construction a positive drive from the back-up rolls is provided for the wafering ring. Although only one back-up roll is shown it will be understood that the other is of the same construction and likewise meshes with the wafering ring to provide a positive drive. It will further be understood that the modification of FIGURE 7 also applies to the construction in FIGURE 6 in which two presser rolls, instead of one, are employed.

What I claim as my invention is:

1. A machine for compressing and pelleting a cut crop comprising a rotatable ring having circumferentially spaced holes extending generally radially therethrough, a plurality of rolls mounted for rotation on axes parallel to but spaced from the axis of said ring, said plurality of rolls providing the sole means for rotatably supporting said ring, said plurality of rolls including a pair of laterally spaced back-up rolls, the distance between said back-up rolls being less than the diameter of said ring, the peripheries of said back-up rolls contacting the radially outer surface of said ring at circumferentially spaced points, said plurality of rolls also including a presser roll for forcing crop material through the holes in said ring, said presser roll being mounted inside said ring, the periphery of said presser roll closely approaching the radially inner surface of said ring at a point which is between the points of contact of said back-up rolls with the radially outer surface of said ring and which is on the shorter of the two arcuate portions of said ring between said back-up rolls so that said ring is cradled against said back-up rolls by said presser roll, one of said back-up rolls having a portion of reduced diameter which portion extends across the holes in said ring in spaced relation to said ring to serve as a pellet cut-off device.

2. A machine for compressing and pelleting a cut crop comprising a rotatable ring having circumferentially spaced holes extending generally radially therethrough, a plurality of rolls mounted for rotation on axes parallel to but spaced from the axis of said ring, said plurality of rolls providing the sole means for rotatably supporting said ring, said plurality of rolls including a pair of laterally spaced back-up rolls, the distance between said back-up rolls being less than the diameter of said ring, the peripheries of said back-up rolls contacting the radially outer surface of said ring at circumferentially spaced points, said plurality of rolls also including a presser roll for forcing crop material through the holes in said ring, said presser roll being mounted inside said ring, the periphery of said presser roll closely approaching the radially inner surface of said ring at a point which is between the points of contact of said back-up rolls with the radially outer surface of said ring and which is on the shorter of the two arcuate portions of said ring between said back-up rolls so that said ring is cradled against said back-up rolls by said presser roll, said back-up rolls each having axially spaced roll portions engaging the radially outer surface of said ring, said roll portions of each back-up roll being connected by a shaft portion of reduced diameter relative to said roll portions which shaft portion extends across the holes in said ring in spaced relation to said ring to serve as a pellet cut-off device.

3. A machine for compressing and pelleting a cut crop comprising a rotatable ring having circumferentially spaced holes extending generally radially therethrough, a plurality of rolls mounted for rotation on axes parallel to but spaced from the axis of said ring, said plurality of rolls providing the sole means for rotatably supporting said ring, said plurality of rolls including a pair of laterally spaced back-up rolls, the distance between said back-up rolls being less than the diameter of said ring, the peripheries of said back-up rolls contacting the radially outer surface of the lower half of said ring at circumferentially spaced points, said plurality of rolls also including a presser roll for forcing crop material through the holes in said ring, said presser roll being mounted inside said ring, the periphery of said presser roll closely approaching the radially inner surface of the lower half of said ring at a point between the points of contact of said back-up rolls with the radially outer surface of said ring, said ring being cradled against said back-up rolls by said presser roll, said back-up rolls each having axially spaced roll portions engageable with the radially outer surface of said ring at opposite sides of the holes therein, said roll portions of each back-up roll being connected by a shaft portion of reduce ddiameter relative to said roll portions which shaft portion is spaced from said ring and extends across the holes therein to serve as a pellet cut-off device.

4. A machine for compressing and pelleting a cut crop comprising a rotatable ring rotatable about a horizontal axis along its center and having circumferentially spaced holes extending generally radially therethrough, a plurality of rolls mounted for rotation on axes parallel to but spaced from the axis of said ring, said plurality of rolls providing the sole means for rotatably supporting said ring, said plurality of rolls including a pair of laterally spaced back-up rolls, the distance between said back-up rolls being less than the diameter of said ring, the peripheries of said back-up rolls frictionally contacting the radially outer convex surface of the lower half of said ring at circumferentially spaced points whereby said ring is cradled between said backup rolls, said plurality of rolls also including a presser roll for forcing crop material through the holes in said ring, said presser roll being mounted inside said ring, the periphery of said presser roll frictionally contacting the radially inner concave surface of the lower half of said ring at a point which lies on a line through the center of said ring passing midway between the points of contact of said back-up rolls with the radially outer convex surface of said ring, means for positively driving at least one of said rolls, said ring being rotated by its friction contact with the positively driven roll, said holes being formed in a central portion of said ring spaced inwardly from the axially opposite sides thereof, said pressor roll having a central portion which closely approaches said central portion of said ring to force crop material through the holes therein, said ring having axially spaced ribs extending radially inwardly beyond and on opposite sides of said central portion of said ring, said central portion of said presser roll extending between and being axially confined by said ribs, said presser roll having end portions of reduced diameter on opposite sides of its central portion in friction contact with the radially inner edges of said ribs, and means for lelivering crop material into the space within the radially inner surface of said ring.

5. A machine for compressing and pelleting a cut crop comprising a rotatable ring rotatable about a horizontal axis along its center and having circumferentially spaced holes extending generally radially therethrough, a plurality of rolls mounted for rotation on axes parallel to but spaced from the axis of said ring, said plurality of rolls providing the sole means for rotatably supporting said ring, said plurality of rolls including a pair of laterally spaced back-up rolls, the distance between said back-up rolls being less than the diameter of said ring, the peripheries of said back-up rolls contacting the radially outer convex surface of said ring at circumferentially spaced points, said plurality of rolls also including a presser roll for forcing crop material through the holes in said ring, said presser roll being mounted inside said ring, the periphery of said presser roll contacting the radially inner concave surface of said ring at a point between the points of contact of said back-up rolls with the radially outer surface of said ring and which is on the shorter of the two arcuate portions of said ring between said back-up rolls, means for positively driving at least one of said rolls, said ring being rotated by its contact with the positively driven roll, and means for delivering crop material into the space within the radially inner surface of said ring, said holes being formed in a central portion of said ring spaced inwardly from the axially opposite sides thereof, said presser roll having a central portion opposed to the central portion of said ring to force crop material through the holes therein, said ring having axially spaced ribs extending radially inwardly beyond and on opposite sides of said central portion of said ring, said central portion of said presser roll extending between and being axially confined by said ribs, said presser roll having end portions of reduced diameter on opposite sides of its central portion in contact with the radially inner edges of said ribs.

6. The machine defined in claim 5, wherein said presser roll is at the top of said ring and said ring is suspended thereon, and said back-up rolls engage said ring above the horizontal center line thereof.

7. The machine defined in claim 5, wherein said back-up rolls are positively driven and are geared to said ring so as to positively rotate said ring.

8. The machine defined in claim 5, wherein said presser roll is positively driven.

9. The machine defined in claim 5, wherein all of said rolls are positively driven.

References Cited by the Examiner

UNITED STATES PATENTS

| | | | |
|---|---|---|---|
| 622,801 | 4/1899 | Hoffmann | 18—9 |
| 1,467,883 | 9/1923 | Sizer | 107—14 |
| 1,869,492 | 8/1932 | O'Halloran | 107—8.35 |
| 2,177,132 | 10/1939 | Crabtree | 107—8.35 |
| 2,626,576 | 1/1953 | Meakin | 107—14 |
| 2,757,621 | 8/1956 | Johnson | 107—14 |
| 2,798,444 | 7/1957 | Meakin | 107—14 |
| 3,124,837 | 3/1964 | Jackson et al. | 18—9 |

FOREIGN PATENTS

| | | |
|---|---|---|
| 20,970 | 1929 | Australia. |
| 777,183 | 11/1934 | France. |

WILLIAM I. PRICE, *Primary Examiner.*

JOSEPH D. SEERS, CHARLES A. WILLMUTH, ROBERT E. PULFREY, WALTER A. SCHEEL,
*Examiners.*

JOSEPH SHEA, *Assistant Examiner.*